US008774074B2

(12) United States Patent
Choi et al.

(10) Patent No.: US 8,774,074 B2
(45) Date of Patent: Jul. 8, 2014

(54) APPARATUS AND METHOD FOR ADAPTIVELY ENABLING DISCONTINUOUS TRANSMISSION (DTX) IN A WIRELESS COMMUNICATION SYSTEM

(71) Applicant: QUALCOMM Incorporated, San Diego, CA (US)

(72) Inventors: Won-Joon Choi, San Diego, CA (US); Rashid Ahmed Akbar Attar, San Diego, CA (US); Jun Hu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 13/663,061

(22) Filed: Oct. 29, 2012

(65) Prior Publication Data

US 2013/0107780 A1    May 2, 2013

Related U.S. Application Data

(60) Provisional application No. 61/554,888, filed on Nov. 2, 2011, provisional application No. 61/712,768, filed on Oct. 11, 2012.

(51) Int. Cl.
  *H04W 52/02*  (2009.01)
(52) U.S. Cl.
  CPC ...... *H04W 52/0209* (2013.01); *H04W 52/0222* (2013.01); *H04W 52/0274* (2013.01)
  USPC ........................................................ 370/311
(58) Field of Classification Search
  None
  See application file for complete search history.

(56) References Cited

U.S. PATENT DOCUMENTS

| 5,737,695 | A | 4/1998 | Lagerqvist et al. |
| 6,590,874 | B1 * | 7/2003 | Wang et al. .................. 370/318 |
| 6,747,958 | B2 * | 6/2004 | Vayanos et al. ............... 370/252 |
| 6,747,963 | B1 | 6/2004 | Park et al. |
| 7,006,828 | B1 | 2/2006 | Czaja et al. |
| 7,146,142 | B1 * | 12/2006 | Raaf .......................... 455/245.1 |

(Continued)

FOREIGN PATENT DOCUMENTS

| CN | 102843208 A | 12/2012 |
| EP | 2328285 A2 | 6/2011 |
| WO | WO-03043221 A1 | 5/2003 |
| WO | WO-2006115623 A2 | 11/2006 |
| WO | 2008076583 A1 | 6/2008 |
| WO | 2011103924 A1 | 9/2011 |

OTHER PUBLICATIONS

International Search Report and Written Opinion—PCT/US2012/063064—ISA/EPO—Feb. 13, 2013.

(Continued)

*Primary Examiner* — Robert C Scheibel
(74) *Attorney, Agent, or Firm* — QUALCOMM IP Department; James Hunt Yancey, Jr.

(57) ABSTRACT

Apparatus and methods are disclosed for gating reverse link transmissions of ¼ rate, ½ rate, ¾ rate, and/or full rate frames in a wireless communication system, such that an access terminal can reduce its power consumption. The gating or discontinuous transmission (DTX) of the reverse link transmission may be conditionally applied based on factors such as the state of the access terminal, the filtered average power of gated the transmissions, or other factors. Further, the gating utilizes a pattern configured to be orthogonal to a pattern utilized for 1x smart blanking, and further configured not to interrupt forward link or reverse link power control signaling. Other aspects, embodiments, and features are also claimed and discussed.

64 Claims, 7 Drawing Sheets

(56) References Cited

U.S. PATENT DOCUMENTS

| | | | |
|---|---|---|---|
| 7,936,741 B2 | 5/2011 | Vimpari et al. | |
| 8,284,652 B2 * | 10/2012 | Jou et al. | 370/209 |
| 8,411,618 B2 * | 4/2013 | Kim et al. | 370/328 |
| 2007/0259682 A1 | 11/2007 | Kaikkonen et al. | |
| 2008/0153429 A1 | 6/2008 | Johnson et al. | |
| 2008/0175204 A1 | 7/2008 | Jen | |
| 2009/0135754 A1 * | 5/2009 | Yavuz et al. | 370/311 |
| 2010/0067441 A1 * | 3/2010 | Kim et al. | 370/328 |
| 2010/0202501 A1 * | 8/2010 | Yang et al. | 375/219 |
| 2010/0323683 A1 | 12/2010 | Kazmi et al. | |
| 2013/0201893 A1 | 8/2013 | Hu et al. | |
| 2013/0215812 A1 * | 8/2013 | Hu et al. | 370/312 |

OTHER PUBLICATIONS

Notification of Transmittal of the International Preliminary Report on Patentability—PCT/US2012/063064—IPEA—Nov. 22, 2013.

Chapter II and Article 34 Amendments With Response to Written Opinion—PCT/US2012/063064—ISA/EP—Jun. 25, 2013.

International Search Report and Written Opinion—PCT/US2013/067294—ISA/EPO—Mar. 12, 2014.

Qualcomm Europe: "TP for Signaling in support of DTX/DRX", 3GPP Draft; R1-061499, 3rd Generation Partnership Project (3GPP), Mobile Competence Centre; 650, Route des Lucioles; F-06921 Sophia-Antipolis Cedex; France, vol. RAN WG1, No. Shanghai, China; 20060502, May 2, 2006, XP050102348.

* cited by examiner

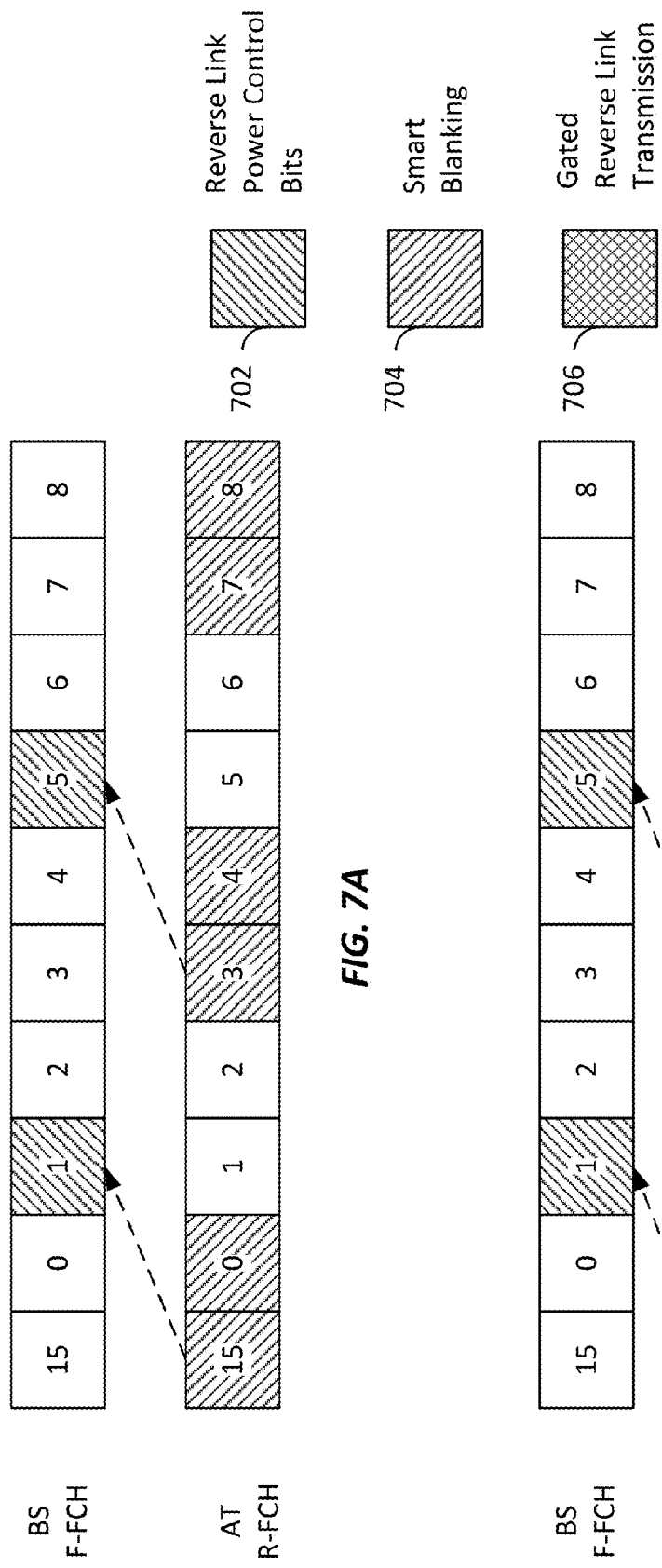
FIG. 7A          FIG. 7B

APPARATUS AND METHOD FOR ADAPTIVELY ENABLING DISCONTINUOUS TRANSMISSION (DTX) IN A WIRELESS COMMUNICATION SYSTEM

CROSS-REFERENCE TO RELATED APPLICATION & PRIORITY CLAIM

This application claims priority to and the benefit of U.S. provisional patent application No. 61/554,888, filed in the United States Patent and Trademark Office on Nov. 2, 2011, the entire content of which is incorporated herein by reference as if fully set forth below and for all applicable purposes.

TECHNICAL FIELD

The following relates generally to wireless communication, and more specifically, to discontinuous transmission (DTX) on a reverse link in a wireless communication system.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

In any wireless communication system, the power consumption at the battery-powered mobile device is one of the most important characteristics for improving user experience, and substantial resources continue to be deployed in the art to reduce power consumption and increase usable life of the mobile devices. For example, because power amplifiers and associated circuitry are relatively energy intensive components of a mobile device, optimization of the radio usage can be one of the most fruitful efforts in terms of addressing power consumption issues.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One or more aspects of the disclosure provide for a method of wireless communication operable at an access terminal. Here, the method includes including transmitting first frames on a reverse link transmission at a first transmit power, and transmitting second frames on the reverse link transmission at a second transmit power, wherein the transmitting of the second frames comprises gating one or more of traffic or pilot frames, and wherein the second transmit power is boosted relative to the first transmit power.

Another aspect of the disclosure provides an access terminal configured for wireless communication, including means for transmitting first frames on a reverse link transmission at a first transmit power, and means for transmitting second frames on the reverse link transmission at a second transmit power, wherein the means for transmitting the second frames is configured to gate one or more of traffic or pilot frames, and wherein the second transmit power is boosted relative to the first transmit power.

Another aspect of the disclosure provides an access terminal configured for wireless communication, including at least one processor, a communication interface coupled to the at least one processor, and a memory coupled to the at least one processor, wherein the at least one processor is configured to transmit first frames on a reverse link transmission at a first transmit power, and transmit second frames on the reverse link transmission at a second transmit power, wherein the at least one processor, being configured to transmit the second frames, is further configured to gate one or more of traffic or pilot frames, and wherein the second transmit power is boosted relative to the first transmit power.

Another aspect of the disclosure provides a computer program product, including a computer-readable storage medium operable at an access terminal, having instructions for causing a computer to transmit first frames on a reverse link transmission at a first transmit power, and to transmit second frames on the reverse link transmission at a second transmit power, wherein the instructions for causing a computer to transmit the second frames, are further configured to gate one or more of traffic or pilot frames, and wherein the second transmit power is boosted relative to the first transmit power.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DRAWINGS

Figure 4:
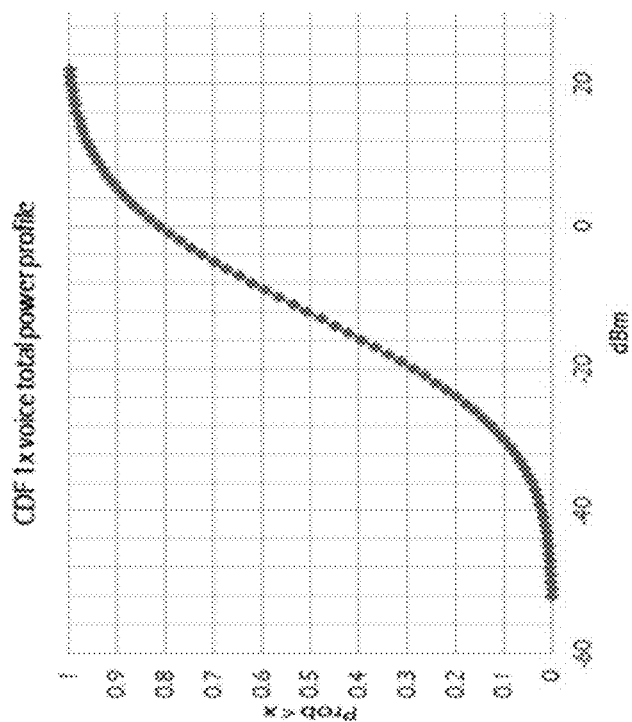
Figure 4:
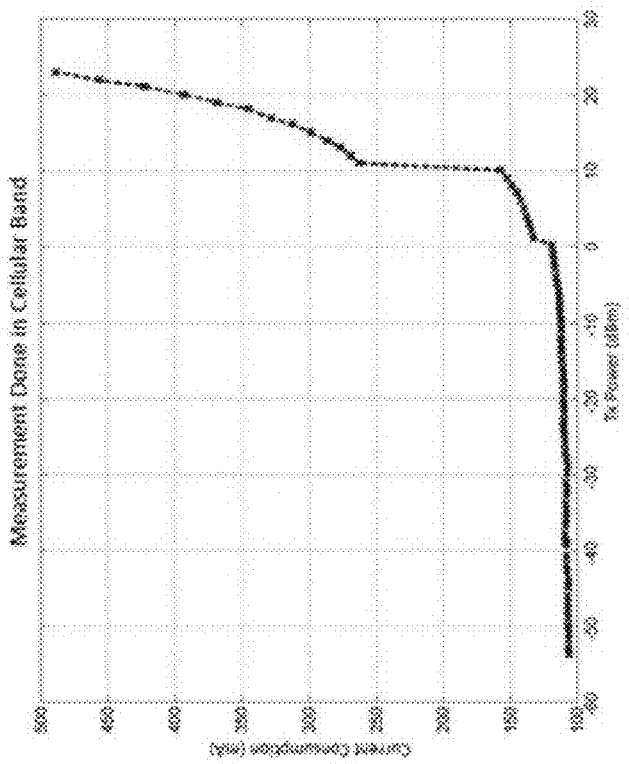

FIG. 4 includes two charts illustrating a nonlinear relationship between reverse link transmit power, and current consumption at an access terminal according to one example.

Figure 5:
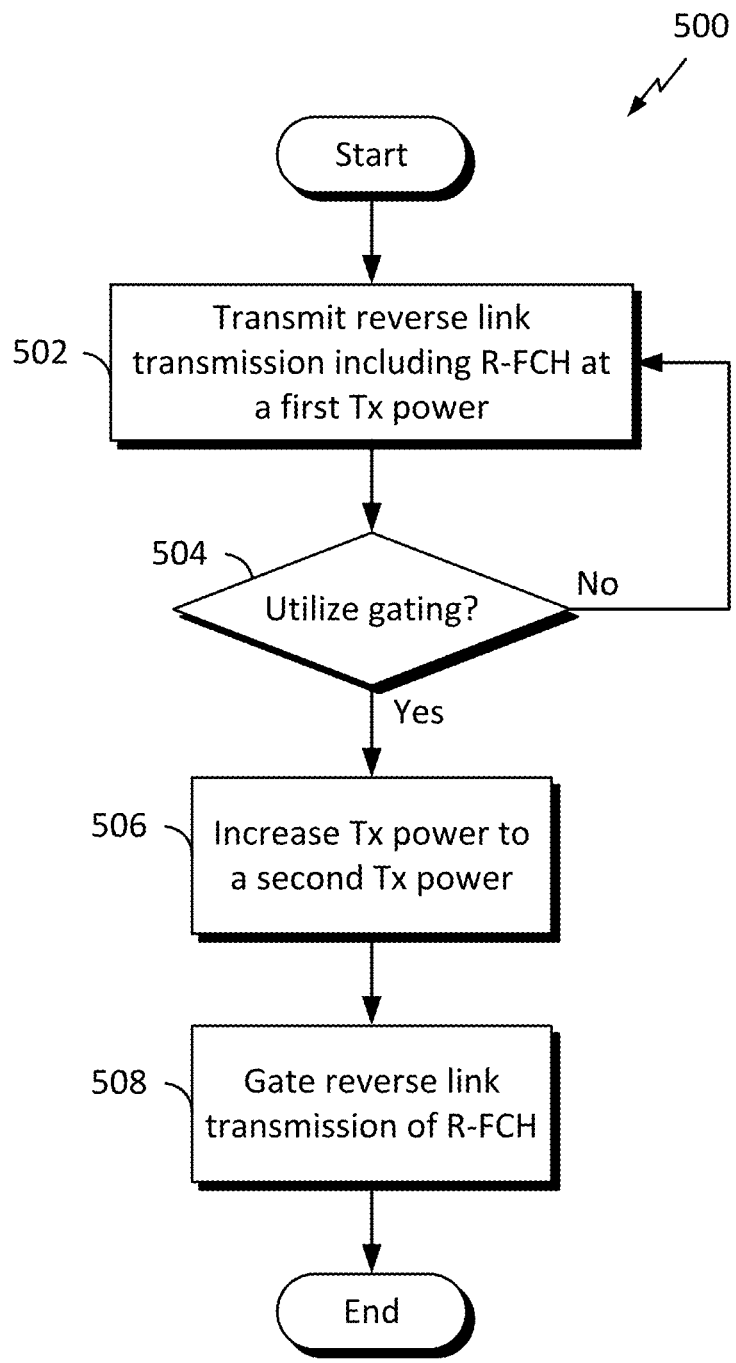

FIG. 5 is a flow chart illustrating a process of gating reverse link transmissions in accordance with an aspect of the disclosure.

Figure 6:
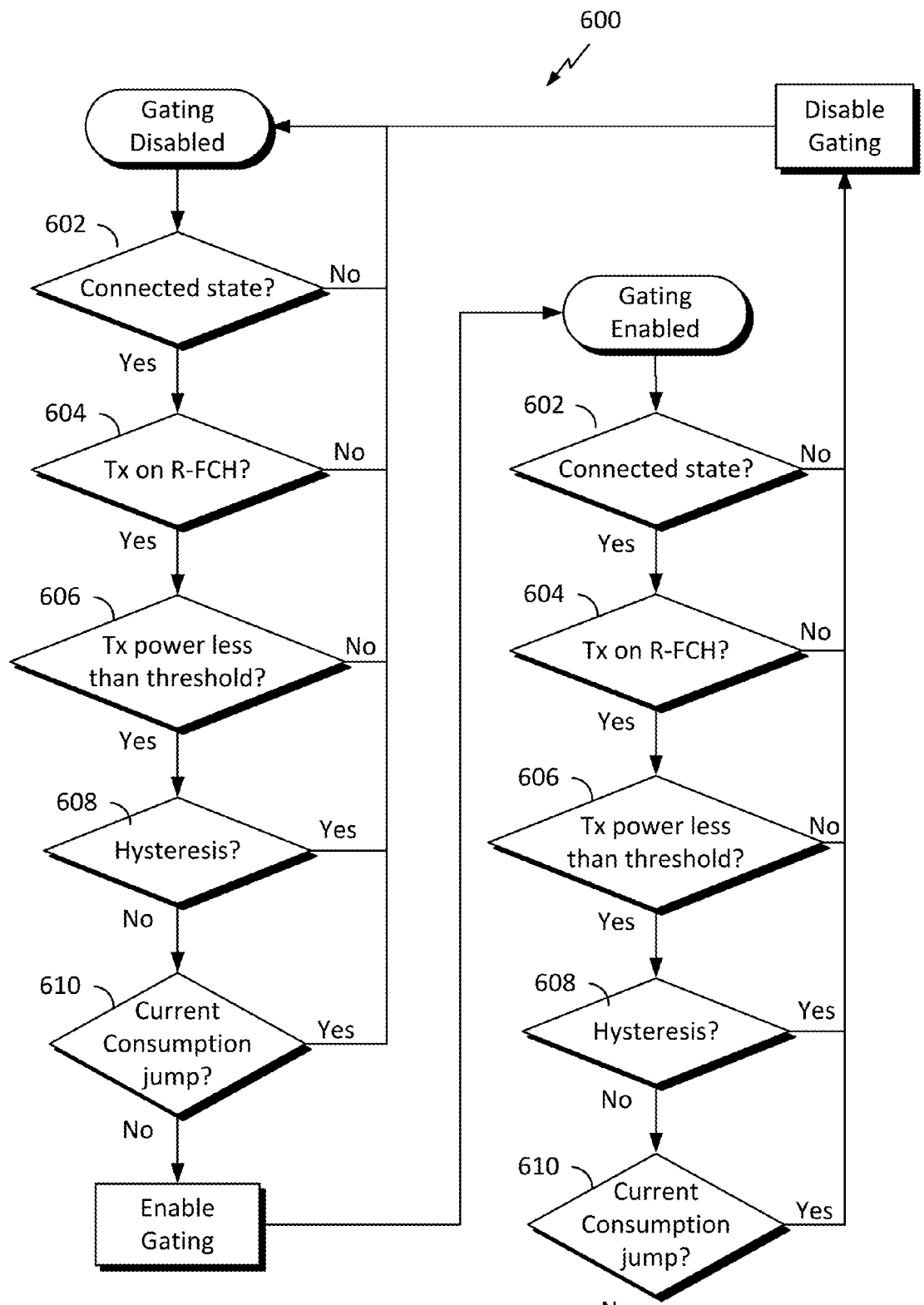

FIG. 6 is a flow chart illustrating a process of determining whether to enable gating of reverse link transmissions in accordance with an aspect of the disclosure.

FIG. 7 includes timing diagrams illustrating a gating pattern utilized in smart blanking, and in gating traffic and/or pilot frames according to one example.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
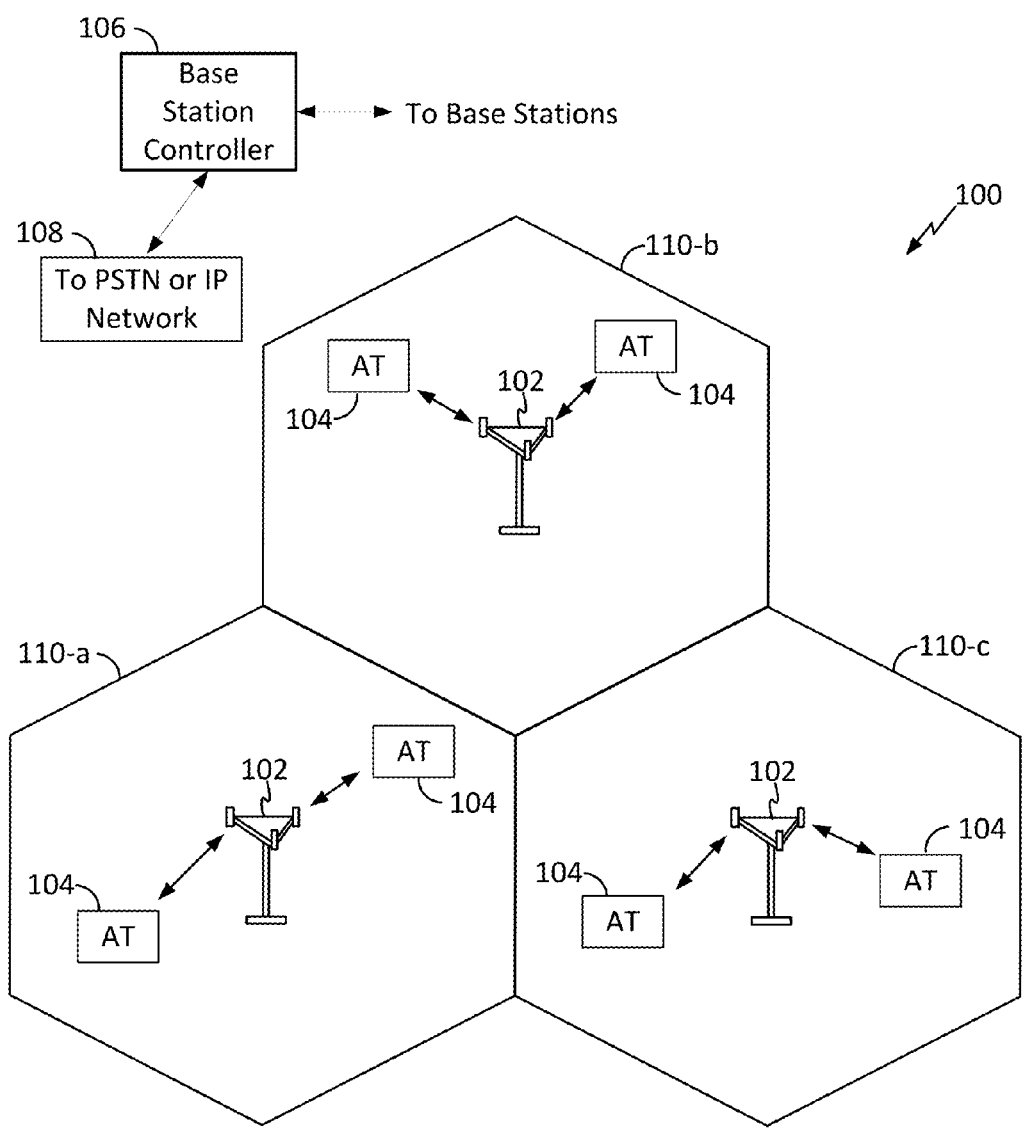
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
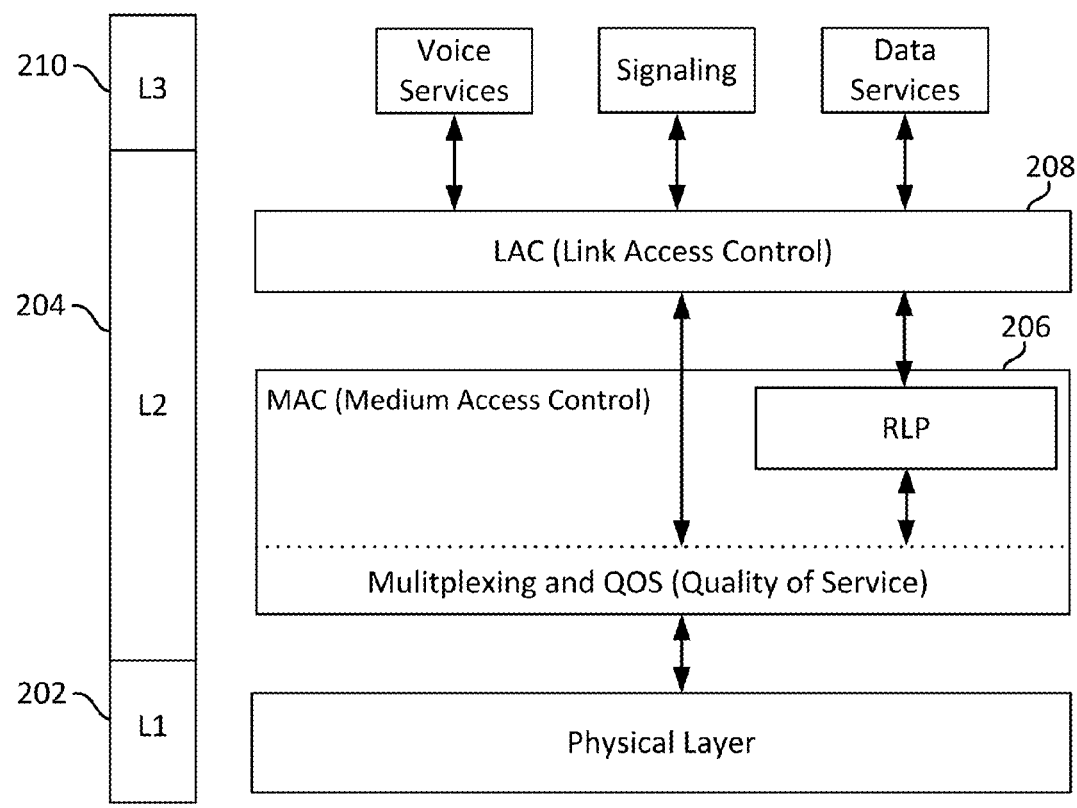
FIG. 2 is a block diagram illustrating an example of a protocol stack architecture which may be implemented by an access terminal.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

Figure 3:
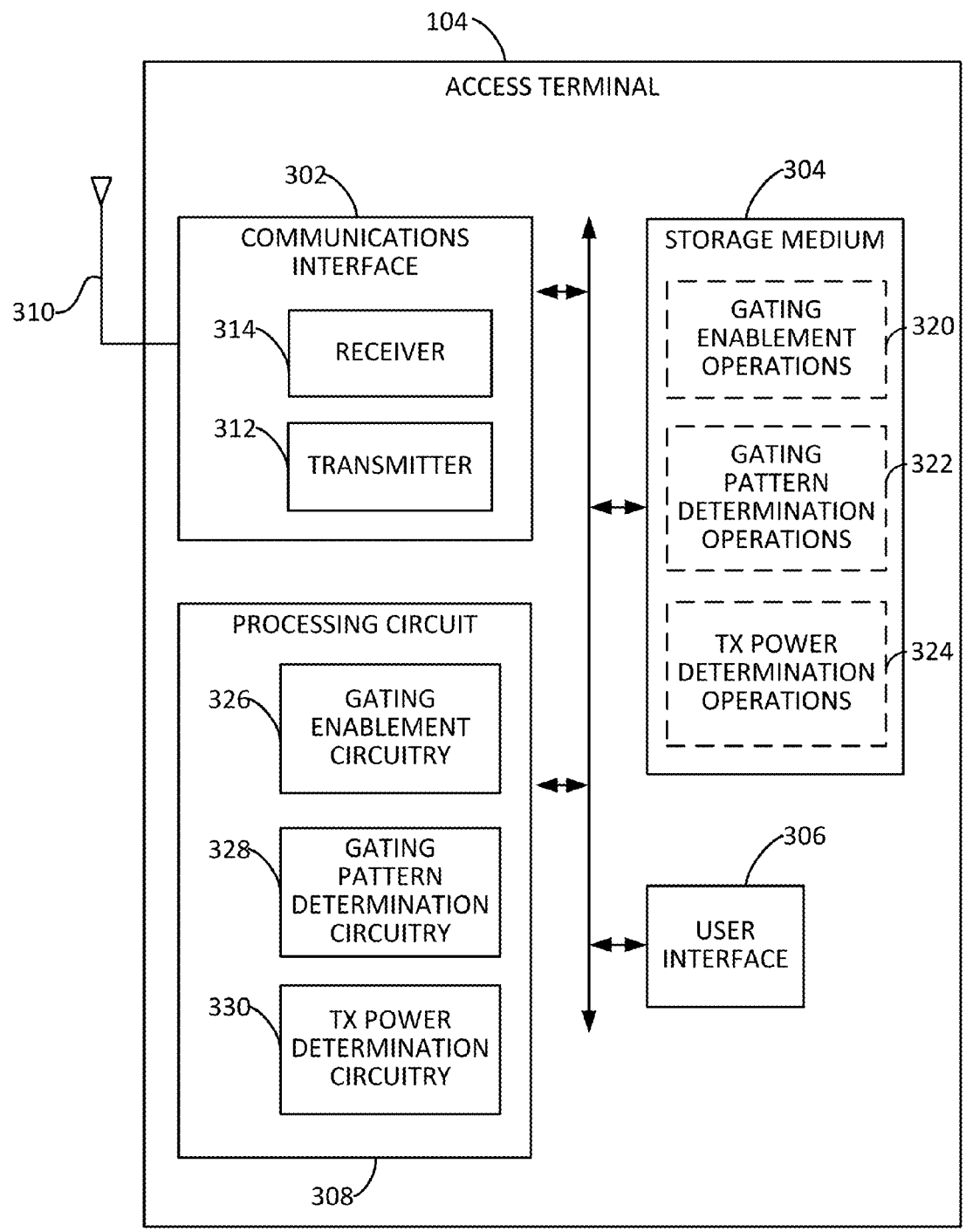
FIG. 3 is a block diagram illustrating select components of an access terminal according to at least one example.

FIG. 3 is a block diagram illustrating select components of an access terminal 104 according to at least one aspect of the disclosure. The access terminal 104 includes a communications interface 302, a storage medium 304, and a user interface 306. These components can be coupled to and/or placed in electrical communications with a processing circuit 308.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 310 for wireless communications within a wireless communications system.

The communications interface 302 can be configured with one or more standalone receivers and/or transmitters, as well as one or more transceivers. In the illustrated example, the communications interface 302 includes a transmitter 312 and a receiver 314.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 308 when executing programming. The storage medium 304 may be any available media that can be accessed by a general purpose or special purpose processor, including portable or fixed storage devices, optical storage devices, and various other mediums capable of storing, containing or carrying programming. By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 308 such that the processing circuit 308 can read information from, and write information to, the storage medium 304. That is, the storage medium 304 can be coupled to the processing circuit 308 so that the storage medium 304 is at least accessible by the processing circuit 308, including examples where at least one storage medium is integral to the processing circuit 308 and/or examples where at least one storage medium is separate from the processing circuit 308 (e.g., resident in the access terminal 104, external to the access terminal 104, distributed across multiple entities).

Programming stored by the storage medium 304, when executed by the processing circuit 308, causes the processing circuit 308 to perform one or more of the various functions and/or process steps described herein. For example, the storage medium 304 may include gating enablement operations 320, gating pattern determination operations 322, and/or Tx power determination operations 324 adapted for regulating operations at one or more hardware blocks of the processing circuit 308, and/or regulating a sequence of operations when utilizing the receiver 314, as described in further detail below. The gating enablement operations 320, gating pattern determination operations 322, and Tx power determination operations 324 may include programming implemented at layer 1 or layer 2 of the protocol stack architecture depicted in FIG. 2, adapted for enabling gating of reverse link transmissions, determining a gating pattern to utilize, and determining a Tx power to utilize while gating the reverse link transmissions.

The processing circuit 308 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 308 is arranged to obtain, process and/or send data, control data access and storage, issue commands, and control other desired operations. The processing circuit 308 may include circuitry configured to implement desired programming provided by appropriate media in at least one example. For example, the processing circuit 308 may be implemented as one or more processors, one or more controllers, and/or other structure configured to execute executable programming. Examples of the processing circuit 308 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 308 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 308 are for illustration and other suitable configurations within the scope of the present disclosure are also contemplated.

According to one or more aspects of the present disclosure, the processing circuit 308 may be adapted to perform any or all of the features, processes, functions, steps and/or routines for any or all of the access terminals 104 described herein. As used herein, the term "adapted" in relation to the processing circuit 308 may refer to the processing circuit 308 being one or more of configured, employed, implemented, and/or programmed to perform a particular process, function, step and/or routine according to various features described herein.

According to at least one example of the access terminal 104, the processing circuit 308 may include gating enablement circuitry 326 adapted for determining whether to enable gating of reverse link transmissions. The gating enablement circuitry 326 may operate independently of, or may utilize programming stored on, one or more components of the storage medium 304. In a further aspect of the disclosure, the processing circuit 308 may include gating pattern determination circuitry 328 adapted for determining a pattern for gating the reverse link transmissions, including on-PCGs and off-PCGs, as described in further detail below. In a further aspect of the disclosure, the processing circuit 308 may include Tx power determination circuitry 330 adapted for determining the Tx power to utilize for gated reverse link transmissions.

In an access terminal 104, the transmitter 312 is one of the most energy-intensive components, and thus, it is an important feature to manage usage of the transmitter 312 to reduce power consumption and increase the active time of the access terminal 104.

Power consumption in a mobile device such as the access terminal 104 is not a linear function of the transmit (Tx) power. That is, suppose the access terminal 104 were to increase its Tx power by any particular amount, denoted as X dB. In this case, the current consumption or power consumption would not increase by the same X dB; rather, it would only increase by a relatively small amount. In fact, depending on the operating point of the transmitter 312, the increase in power consumption corresponding to relatively large increases in Tx power can be minimal.

For example, referring to FIG. 4, Chart A illustrates one example of a relationship between current consumption at an access terminal as a function of the Tx power. As can be seen in Chart A, when the Tx power is in the range of about −55 dBm to 0 dBm, even relatively large increases in the Tx power result in relatively small changes in current consumption. Moreover, even though there is a discontinuity at about 0 dBm, in the range of about 0 dBm to 10 dBm, increases in the Tx power still result in relatively small changes to current consumption at the access terminal. Only as the Tx power approaches its limit, which may be near 23 dBm, does an increase in the Tx power result in a relatively large increase in current consumption.

Referring now to Chart B in FIG. 4, an example of a cumulative distribution function of Tx power over some typical usage scenarios is illustrated. Here, it can be seen that the Tx power is in the range less than 0 dBm for the large majority of the time, e.g., about 80% of the time; and the Tx power exceeds 10 dBm very infrequently, e.g., about 5% of the time.

Based on this observation, according to an aspect of the present disclosure, limiting the on-time of the transmitter can be a more effective means of reducing power consumption than reducing the Tx power. That is, efforts to reduce the Tx power would, most of the time, only result in relatively small reductions in the current consumption at the access terminal, while efforts to reduce the amount of time that the transmitter is actually transmitting may be more fruitful.

Moreover, when the on-time of the transmitter is limited, the transmit power can in fact be increased, for example, if it is desired to keep the average transmit power the same. For example, the Tx power itself may be directly increased; or, in some examples, a transmit-to-pilot (T2P) ratio received from the network in a power control command may be altered or overridden to result in an increase in the Tx power. In various aspects of the present disclosure, gated transmission algorithms (which might be referred to as a slotted mode or discontinuous transmission (DTX)) adapted to reduce the transmission time of the access terminal 104 are provided.

Gated transmission essentially means that the transmission on the reverse link is shut off some of the time, rather than engaging in a continuous transmission. That is, one may gate off both data and pilot channels, while still enabling the receiver at the base station to reliably decode the data. The gating can be characterized by its duty cycle, which may be represented by a percentage, indicating the percent of a given window during which transmissions take place, the remainder being where the transmitter 312 is shut off. Here, when gated on, power consumption is relatively high, being based on the Tx power; but while gated off, power consumption is relatively low, since the power amplifier at the transmitter 312 is turned off.

In addition to power savings at the transmitter 312, such gating can also result in a reduction of interference caused by the access terminal 104, and a corresponding increase in capacity in the cell. However, these benefits come at the expense of a decrease in the SNR of the reverse link transmission, and less raw bits per second being transmitted at the reverse link.

To combat this reduced SNR, as mentioned above, the Tx power and/or the traffic-to-pilot (T2P) ratios may be boosted when gating is enabled at the access terminal 104. Moreover, with respect to a CDMA 1x reference signal, there is significant redundancy in reverse link transmissions resulting from the use of coding and repetition in the symbols. For example, a coding rate of ¼ might be utilized for reverse link transmissions, indicating 3 redundant bits for every information bit. Due to this redundancy, gating of the transmission generally results in little to no loss of data at the base station receiver.

Thus, to improve power consumption, in some aspects of the disclosure, when gating is enabled the reverse link signal can be transmitted at a higher power when gated on, but may be gated off during other times. Here, due to the nonlinearity in power consumption, it may be possible to increase the Tx power during on times, but to gate off the transmission half the time, resulting in the same or lower average transmitted power and a reduction in power consumption at the access terminal 104.

Various aspects of the present disclosure provide for gating of the reverse link transmissions in such a way that no changes are needed at the base station or at the network, and in fact the base station and network need not be informed that the access terminal 104 is implementing gating. That is, some aspects of the disclosure may be configured such that an access terminal 104 implementing gating as described herein may be backwards-compatible, and interoperable with existing base stations and networks.

For example, FIG. 5 is a flow chart illustrating an exemplary process 500 operable at an access terminal such as the access terminal 104 for utilizing gating of reverse link transmissions in accordance with an aspect of the disclosure. As illustrated, at step 502 the access terminal 104 may transmit a reverse link transmission including data and/or pilot frames on the R-FCH, wherein the transmission utilizes a first Tx power. At step 504, the access terminal 104 may determine whether or not to utilize gating on the R-FCH transmission in accordance with one or more determining factors, as described in further detail below. In various examples, the processing circuit 308 may be configured to execute instructions stored at the storage medium 304 to make the determination at step 504, and may utilize as factors for the determination, input parameters such as power control information received from a base station (e.g., a T2P transmit to pilot power ratio), the current Tx power, past Tx powers (in the case of hysteresis or filtered/averaged Tx powers), the operational state of the access terminal 104, or any other suitable parameters, as described in further detail below. In some examples, the processing circuit 308 may include gating enablement circuitry 326 configured to make the determination whether to enable gating in step 504.

If the access terminal 104 at step 504 determines not to utilize gating, then the process may return to step 502, and continue to transmit the R-FCH at the first Tx power. On the other hand, if at step 504 the access terminal 104 at step 604 determines to utilize gating, then the process may proceed to step 506, wherein the access terminal 104 may increase the Tx power to a second Tx power and/or boost the T2P ratio (e.g., by utilizing Tx power determination circuitry 330), and at step 508, the access terminal may transmit the R-FCH utilizing a suitable gating pattern as determined by gating pattern determination circuitry 328, as described in further detail below.

However, when gating traffic and pilot frames, there remain several issues to consider. For example, when exactly the gating should occur to achieve the best improvement in power efficiency; by what amount to actually increase the transmit power when transmitting; and what gating pattern to utilize. Thus, in accordance with some aspects of the disclosure, gating may be enabled only under certain conditions. Referring again to FIGS. 3 and 5, the gating enablement circuitry 326 may operate to perform whether to enable the gating as illustrated at step 504.

FIG. 6 is a flow chart illustrating one example of a process for determining whether to utilize gating for a reverse link transmission in accordance with an aspect of the disclosure. In some examples, the process 600 may be performed by the processing circuit 308 utilizing instructions stored at the storage medium 304; and in some examples, the process 600 may be performed by gating enablement circuitry 326, as described above with respect to step 604.

For example, in an aspect of the disclosure corresponding to step 602, gating of traffic and/or pilot frames may only be enabled when the access terminal 104 is in its connected state. In connected state, a connection between the access terminal 104 and base station 102 is open, such that user data may be exchanged between the access terminal 104 and the base station 102, e.g., where user and signaling data may be transmitted by the access terminal 104 on the reverse fundamental channel (R-FCH) while a call is active. That is, in this example, if the access terminal 104 is in any other state (e.g., an initialization state, an idle state, or a standby state), even though the access terminal 104 might be enabled to transmit frames on the reverse link in that state, in this example gating would not be used in those states. Rather, gating would be used only when reverse link traffic and/or pilot frames are being transmitted while the access terminal 104 is in its connected state.

In another example, in an aspect of the disclosure corresponding to step 604, gating may only be utilized for reverse link traffic and/or pilot frames transmitted on the reverse fundamental channel (R-FCH). The R-FCH is a reverse link channel utilized for carrying traffic frames or user data. That is, the R-FCH can be used to carry voice traffic, low-rate data traffic, and/or signaling information.

In yet another example, in an aspect of the disclosure corresponding to step 606, gating of traffic and/or pilot frames may be utilized only if a Tx power (e.g., a filtered and/or time-averaged Tx power) is below a certain threshold. Here, the threshold may be any suitable value for the Tx power, and in some examples may be based on the maximum $P_{max}$, i.e., a maximum limit of the Tx power for the transmitter (in the example discussed above, with reference once again to FIG. 4, $P_{max}$ may be 23 dBm). For example, the threshold may correspond to a level of $P_{max}-X$ dB, where X is a configurable level in dB, such as 4 dB.

Further, the time-average of the Tx power may be computed while the gating is being utilized, wherein the transmission is turned off during a portion of the time, but utilizes an increased power at the on-portions of the gating period. Here, the time-average may be computed over any suitable window, including at least one gating period. In some examples, the averaged Tx power may additionally be suitable filtered, e.g., by utilizing an IIR filter with a configurable filter coefficient such as a=0.9. That is, in this example, for a given frame having an index i, the access terminal 104 may calculate a time-averaged Tx power $TxP_{avg}[i]$ utilizing a suitable time-averaging algorithm. For example, the arithmetic mean value of the Tx power calculated over a suitable window may be utilized. Further, the access terminal 104 may calculate a filtered Tx power $TxP_{filt}[i]$ utilizing a suitable IIR filter. For example:

$$TxP_{filt}[i]=\alpha \cdot TxP_{filt}[i-1]+(1-\alpha) \cdot TxP_{avg}[i].$$

Thus, in one example, gating of the traffic and/or pilot frames may be utilized only if the time-averaged and filtered Tx power $TxP_{filt}[i]<P_{max}-X$ dB.

In still another example, in an aspect of the disclosure corresponding to step 608, the turning on and turning off of gating of the traffic and/or pilot frames may incorporate a certain hysteresis. This hysteresis may be configurable, such that a hysteresis constant of Y dB may be utilized, where Y may have a default value of 2 dB, with this amount capable of being altered as needed.

In one example utilizing hysteresis, if gating of the traffic and/or pilot frames is turned on, the gating may be turned off only if $TxP_{filt}[i] \geq P_{max}-X$. On the other hand, if gating of the traffic and/or pilot frames is turned off, the gating may be turned on only if $TxP_{filt}[i] \leq P_{max}-X-Y$.

In still another example, in an aspect of the disclosure corresponding to step 610, the turning on and turning off of gating of the traffic and/or pilot frames may be conditional upon significant current consumption jumps due to power amplifier gain changes. That is, as described above and illustrated in Chart A in FIG. 4, if the current-to-power relationship exhibits discontinuities, as exemplified in the illustration at about 0 dB and 10 dB, it might make sense to utilize gating at certain Tx power levels, but not at other power levels.

The process 600 is illustrated according to one example, wherein each of the above-described conditions for enabling gating is implemented in an AND fashion, such that each condition must be true to enable gating. However, this is merely one example, and various implementations within the scope of the present disclosure may utilize any one or more of these factors conditions in any suitable combination.

In 1x Advanced, there exists a feature referred to as "smart blanking," which is similar to gating of background noise transmissions. That is, in a 1x network, ⅛ rate frames are used to carry information on the background noise during a voice call. During a period of silence during the voice call, most of these ⅛ rate frames carry repetitive information that has generally no use for the receiver. With an access terminal having smart blanking enabled, when a user of the access terminal is silent during a voice call, such that the traffic pattern exhibits a relatively large period of inactivity, some of these ⅛ rate traffic frames are not transmitted. For example, traffic frames may be withheld from transmission when the traffic pattern corresponds to unchanging background noise. That is, with smart blanking, the background noise can be effectively reproduced at the receiving end by only transmitting the ⅛ rate frames when the background noise changes. This way, the overhead and interference generated by the access terminal can be substantially reduced, increasing capacity in the cell.

In one or more aspects of the disclosure, the gating of the forward link transmissions (e.g., on the R-FCH) described above may be considered as an extension to the general paradigm utilized in smart blanking, applying to other types of transmissions in addition to the ⅛ rate frames that may be gated under smart blanking. That is, in an aspect of the disclosure, not only ⅛ rate frames may be gated, as in conventional smart blanking, but here, traffic and/or pilot frames may be gated for other frame rates (e.g., one or more of ⅛, ¼, ½, and/or full rate). Thus, according to various aspects of the disclosure, gating or DTX may be utilized for transmitting traffic and/or pilot frames.

However, when gating the traffic or pilot frames as disclosed herein, there arise additional concerns relating to the gating pattern to utilize that do not arise in conventional smart blanking. Thus, in a further aspect of the disclosure, once a determination is made to utilize gating on reverse link traffic and/or pilot transmissions, a suitable gating pattern may be determined. Referring to FIGS. 3 and 5, at step 508 wherein the access terminal 104 implements gating of the reverse link transmissions, the access terminal 104 may determine a gating pattern utilizing a general purpose processor 308 along with instructions stored at a storage medium 304, and/or by utilizing gating pattern determination circuitry 328.

For example, the gating pattern may be configured to be orthogonal to the already-existing smart blanking pattern, in order to avoid certain issues that might otherwise arise relating to the use of smart blanking by the base station to make decisions about erasures and CRC failures. That is, if the gating is implemented at the access terminal only, without coordination between the access terminal 104 and the base station 102, certain constraints on the gating pattern help prevent confusion that might arise from the use of the same or similar gating pattern as used in smart blanking.

In 1x technology, a frame duration is 20 ms, and within this frame are included 16 time slots (called power control groups or PCGs in 1x terminology), each PCG having a duration of 1.25 ms. FIG. 7 illustrates two timing diagrams illustrating PCGs on the forward fundamental channel (F-FCH), transmitted by the base station, and on the reverse fundamental channel (R-FCH), transmitted by the access terminal 104, with each PCG being identified by a corresponding PCG index 1-15.

FIG. 7A illustrates a conventional scheme for 1x-Advanced smart blanking. Here, reverse link PCGs with the hatch pattern from upper left to lower right, as in example frame 704, indicate that transmission is enabled during that PCG; and reverse link PCGs colored white, without any hatch, indicate that transmission is disabled during that PCG. In this illustration, with smart blanking, PCGs 15, 0, 3, 4, 7, and 8 are gated on, while PCGs 1, 2, 5, and 6 are gated off for ⅛ rate frames.

Further, in FIG. 7A, forward link PCGs with the hatch pattern from the upper right to the lower left, as in example frame 702, indicate that power control bits for the reverse link are transmitted during that PCG, and forward link PCGs colored white, without any hatch, indicate that transmission is disabled during that PCG. The power control bits are discussed in further detail below.

In some conventional base station deployments, the data frames transmitted on the reverse link (e.g., using the R-FCH) during each PCG utilize a cyclic redundancy check (CRC) to verify the integrity of the frame at the receiving end. When the CRC fails, there is a possibility that the data received was corrupt, but there is also a possibility that the frame was blanked due to smart blanking. Thus, when the CRC fails, the receiving end uses the known smart blanking gating pattern to decide whether the CRC failure was caused by an erasure or by smart blanking.

When utilizing gating for traffic and/or pilot frames as described in the present disclosure, if the same gating pattern were used as the pattern used for smart blanking, a CRC failure corresponding to an actual erasure may erroneously be classified as one corresponding to blanked frames, resulting in an increased forward error rate relative to the desired forward error rate for the outer loop. Thus, in a further aspect of the disclosure, to reduce or avoid this potential for erroneous classification of CRC failures, the gating pattern for reverse link traffic and/or pilot frames may be chosen to be a pattern that is orthogonal to the pattern used for smart blanking. For example, when the gating pattern is orthogonal to the smart blanking pattern, it is possible for the receiver to distinguish the gating pattern used as described herein from the gating patterns utilized in smart blanking, reducing or eliminating erroneous classification of any CRC failures on reverse link transmissions.

Referring now to FIG. 7B, an exemplary gating pattern in accordance with an aspect of the disclosure is shown, for gating traffic and/or pilot frames on the R-FCH. Here, reverse link PCGs with the cross-hatch pattern, as in example frame 706, indicate that transmission of the traffic and/or pilot is enabled (gated on) during that PCG, and reverse link PCGs colored white (without any hatch pattern) indicate that transmission is disabled (gated off) during that PCG. In this illustration, PCGs 15, 2, 3, 6, and 7 are gated on, while PCGs 0, 1, 4, 5, and 8 are gated off for traffic and/or pilot frames. In comparing the gating pattern for smart blanking, shown in FIG. 7A, with the gating pattern described herein, shown in FIG. 7B, it can be seen that the respective gating patterns are orthogonal to one another.

Of course, this particular pattern illustrated with the cross-hatch pattern in FIG. 7B is merely exemplary in nature, and any suitable gating pattern orthogonal to that utilized by a smart blanking algorithm may be utilized in accordance with various aspects of the present disclosure.

Another constraint on the gating pattern may relate to the use of gating only in certain PCGs. That is, certain PCGs are generally designated for the transmission of forward-link power control (FPC) messages (e.g., power measurement report messages transmitted by the access terminal 104 and carried on the R-FCH). However, if gating is utilized as described in the present disclosure for traffic and/or pilot frames on the R-FCH, if a particular PCG is designated as an off-PCG, the power control information cannot be transmitted during that PCG. Thus, unless a suitable gating pattern is chosen, many of these off-PCGs will fail forward link power control quality measurements at the base station.

Specifically, in some examples utilizing 1x technology FPC information may be transmitted on PCG 3, 7, 11, and 15. Thus, in an aspect of the disclosure, these PCGs may be designated as always on-PCGs for gating. That is, in the example above, PCGs 3, 7, 11, and 15 may be designated as "on"-PCGs for gating purposes.

In a similar fashion, reverse link power control (RPC) messages are transmitted from the base station 102 to the access terminal 104, being based upon base station measurements of reverse link transmissions. For example, referring again to FIG. 7, certain arrows are shown linking PCGs used for reverse link transmissions and PCGs used for forward link transmissions. These arrows are used to illustrate the correspondence between a reverse link transmission, e.g., during PCG 15, and a forward link transmission, e.g., during PCG 1, which carries a reverse link power control command corresponding to that linked reverse link PCG. That is, due to processing and measuring delays at the base station, the RPC messages received at the access terminal 104 in a particular PCG generally correspond to a reverse link transmission made by the access terminal 104 some PCGs earlier.

In a further aspect of the disclosure, due to the gating of reverse link transmissions, some of these RPC messages from the base station might be based on measurements made or attempted by the base station during off-PCGs. That is, if the base station 102 were to try to measure the reverse link from the access terminal 104 during a PCG when the reverse link is not transmitted, an erroneous power control command may be transmitted by the base station 102.

Thus, in an aspect of the disclosure, the access terminal 104 may be configured to ignore reverse link power control bits corresponding to off-PCGs. That is, referring again to the exemplary timing diagram illustrated in FIG. 7B, when the illustrated gating pattern is utilized for traffic and/or pilot frames, power control bits (PCBs) received from the base station on the F-FCH during PCGs 1 and 5 correspond to on-PCGs, and may be utilized for power control. However, when the access terminal 104 receives power control information corresponding to an off-PCG, such as PCG 0, the access terminal 104 may ignore that power control information.

More generally, in an aspect of the disclosure, the access terminal 104 may configure a mask such that only reverse link power control information received by the access terminal 104 during PCGs 1, 5, 9, and 13 are considered valid; any other power control bits may be ignored by the access terminal 104.

As described above with reference to step 506 in FIG. 5, in a further aspect of the disclosure, when implementing gating on the traffic and/or pilot frames, the Tx power may be boosted during on-PCGs. Here, the processing circuit 308 may operate in accordance with instructions stored at the storage medium 304, and/or the control of the reverse link power may be undertaken by Tx power determination circuitry 330, as described above.

For example, assuming the Tx power without gating being enabled were $P_1$ dBm, once gating is enabled the Tx power during on-PCGs may be set to a value of $P_1+Z$ dBm. Here, Z may take any suitable value, and in various examples, may be fixed or may be configurable by the mobile station in accordance with one or more factors. In some aspects of the disclosure, this boost Z to the Tx power may be in the form of an alteration to the transmit-to-pilot (T2P) ratio received at the mobile station from the network.

Existing standards for 1x-Advanced include the concept of frame early termination. By utilizing frame early termination, for forward link transmissions, when the base station 102 sends forward link traffic, if the SNR is sufficient the access terminal 104 may be enabled to decode the frame earlier than the end of the frame. In this case, the access terminal 104 may send an acknowledgment message (ACK) indicating that the frame has been successfully received, such that the base station 102 may accordingly cease its transmission. In this way, the base station 102 can save power, reduce interference to other cells, etc.

Thus, in a further aspect of the disclosure, in an access terminal 104 with both frame early termination and gating of traffic and/or pilot frames enabled as described herein, there may be an issue if the frame early termination ACK message is scheduled to be transmitted during an off-PCG according to the selected gating pattern. Therefore, the gating pattern determination circuitry 326 may be enabled to compensate the pattern for frame early termination.

A frame early termination ACK mask is used in current specifications to define which PCGs can be used to send the ACK message if the frame is decoded early. For example, existing standards for 1x-Advanced describe an ACK mask of 0x0998 (in binary, 0000100110011000, such that the ACK mask is set for PCGs 4, 7, 8, 11, and 12). However, referring once again to FIG. 7B, if the exemplary gating pattern described herein above is utilized in combination with this ACK mask, PCGs 4, 8, and 12, while scheduled for ACK transmissions, fall within off-PCGs when gating is enabled.

Thus, according to an aspect of the disclosure, if a frame early termination ACK is scheduled to be sent during an off-PCG corresponding to the gating pattern, then the ACK is sent on the next on-PCG within the current frame where the ACK mask is set. For example, if an ACK is to be transmitted during PCG4 while gating is enabled, the ACK will instead be transmitted during PCG7; if an ACK is to be transmitted during PCG8 while gating is enabled, the ACK will instead be transmitted during PCG11; and if an ACK is to be transmitted during PCG12 while gating is enabled, then no ACK is transmitted.

While the above discussed aspects, arrangements, and embodiments are discussed with specific details and particularity, one or more of the components, steps, features and/or functions illustrated in FIGS. 1, 2, and/or 3 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, and/or 3 may be configured to perform or employ one or more of the methods, features, parameters, or steps described in FIGS. 5, 6, and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

The invention claimed is:

1. A method of wireless communication operable at an access terminal, comprising:
   transmitting first frames on a reverse link transmission at a first transmit power; and
   transmitting second frames on the reverse link transmission at a second transmit power,
   wherein the transmitting of the second frames comprises gating one or more of traffic or pilot frames,
   wherein the gating comprises turning on and off the reverse link transmission utilizing a gating pattern that is orthogonal to a gating pattern utilized for smart blanking, and
   wherein the second transmit power is boosted relative to the first transmit power.

2. The method of claim 1, wherein the gating pattern utilized for smart blanking comprises a gating pattern utilized for 1x smart blanking of ⅛ rate frames.

3. The method of claim 1, wherein the gating is applied only when the access terminal is in a connected state.

4. The method of claim 1, wherein the second frames comprise one or both of traffic frames or pilot frames.

5. The method of claim 4, wherein the one or both of traffic frames or the pilot frames are carried on a reverse fundamental channel (R-FCH).

6. The method of claim 1, wherein the gating is applied only if a transmit power of the reverse link transmission is less than a threshold.

7. The method of claim 6, wherein the threshold corresponds to a difference between a maximum transmit power and a first value.

8. The method of claim 7, further comprising altering the first value.

9. The method of claim 7, wherein the transmit power comprises a time-average transmit power.

10. The method of claim 7, wherein the transmit power comprises a filtered average transmit power, such that the gating is applied only if $TxP_{filt}[i] < P_{max} - X$ dB, wherein:
    $P_{max}$ is the maximum transmit power;
    X is the first value;
    i is a frame index; and
    $TxP_{filt}[i]$ is the filtered average transmit power corresponding to a frame having the frame index i.

11. The method of claim 10, wherein the filtered average transmit power $TxP_{filt}[i]$ is equal to $\alpha \cdot TxP_{filt}[i-1] + (1-\alpha) \cdot TxP_{avg}[i]$, wherein:
    $\alpha$ is a filter coefficient; and
    $TxP_{avg}[i]$ is a time-average of a transmit power over a plurality of frames.

12. The method of claim 1, wherein the gating utilizes hysteresis, such that the gating comprises:
    turning off the gating when $TxP_{filt}[i] \geq P_{max} - X$; and
    turning on the gating when $TxP_{filt}[i] \leq P_{max} - X - Y$,
    wherein:
        i is a frame index;
        $TxP_{filt}[i]$ is a filtered average transmit power corresponding to a frame having the frame index i;
        $P_{max}$ is a maximum transmit power;
        X is the first value; and
        Y is a hysteresis constant.

13. The method of claim 1, further comprising:
    configuring a mask comprising set bits corresponding to power control groups for receiving reverse link power control information,
    wherein the gating utilizes a pattern configured such that the reverse link transmission is turned on during the set bits of the mask.

14. The method of claim 1, wherein the gating pattern is configured such that power control groups allocated for transmission of forward link power control information are designated for the turning on of the reverse link transmission.

15. The method of claim 1, further comprising ignoring reverse link power control information that corresponds to a power control group during which the reverse link transmission is turned off.

16. The method of claim 1, further comprising:
    re-scheduling a frame early termination acknowledgment (ACK) message allocated to a power control group in a first frame, corresponding to the turning off of the reverse link transmission, to be transmitted during the next power control group in the first frame corresponding to the turning on of the reverse link transmission, wherein the next power control group in the first frame corresponding to the turning on of the reverse link transmission corresponds to a set bit in an ACK mask utilized for frame early termination ACK messages.

17. An access terminal configured for wireless communication, comprising:
    means for transmitting first frames on a reverse link transmission at a first transmit power; and
    means for transmitting second frames on the reverse link transmission at a second transmit power,
    wherein the means for transmitting the second frames is configured to gate one or more of traffic or pilot frames by turning on and off the reverse link transmission utilizing a gating pattern that is orthogonal to a gating pattern utilized for smart blanking, and
    wherein the second transmit power is boosted relative to the first transmit power.

18. The access terminal of claim 17, wherein the gating pattern utilized for smart blanking comprises a gating pattern utilized for 1x smart blanking of ⅛ rate frames.

19. The access terminal of claim 17, wherein the means for transmitting the second frames is configured to gate one or more of the traffic or pilot frames only when the access terminal is in a connected state.

20. The access terminal of claim 17, wherein the second frames comprise one or both of traffic frames or pilot frames.

21. The access terminal of claim 20, wherein the one or both of traffic frames or the pilot frames are carried on a reverse fundamental channel (R-FCH).

22. The access terminal of claim 17, wherein the means for transmitting the second frames is configured to gate one or more of traffic or pilot frames only if a transmit power of the reverse link transmission is less than a threshold.

23. The access terminal of claim 22, wherein the threshold corresponds to a difference between a maximum transmit power and a first value.

24. The access terminal of claim 23, further comprising means for altering the first value.

25. The access terminal of claim 23, wherein the transmit power comprises a time-average transmit power.

26. The access terminal of claim 23, wherein the transmit power comprises a filtered average transmit power, such that the means for transmitting the second frames is configured to gate one or more of traffic or pilot frames only if $TxP_{filt}[i] < P_{max} - X$ dB, wherein:

$P_{max}$ is the maximum transmit power;
X is the first value;
i is a frame index; and
$TxP_{filt}[i]$ is the filtered average transmit power corresponding to a frame having the frame index i.

27. The access terminal of claim 26, wherein the filtered average transmit power $TxP_{filt}[i]$ is equal to $\alpha \cdot TxP_{filt}[i-1] + (1-\alpha) \cdot TxP_{avg}[i]$, wherein:
α is a filter coefficient; and
$TxP_{avg}[i]$ is a time-average of a transmit power over a plurality of frames.

28. The access terminal of claim 17, wherein the gating utilizes hysteresis, such that the means for transmitting the second frames, being configured to gate one or more of traffic or pilot frames, is further configured to:
turn off the gating when $TxP_{filt}[i] \geq P_{max} - X$; and
turn on the gating when $TxP_{filt}[i] \leq P_{max} - X - Y$,
wherein:
i is a frame index;
$TxP_{filt}[i]$ is a filtered average transmit power corresponding to a frame having the frame index i;
$P_{max}$ is a maximum transmit power;
X is the first value; and Y is a hysteresis constant.

29. The access terminal of claim 17, further comprising:
means for configuring a mask comprising set bits corresponding to power control groups for receiving reverse link power control information,
wherein the means for transmitting the second frames is configured to gate one or more of traffic or pilot frames utilizing a pattern configured such that the reverse link transmission is turned on during the set bits of the mask.

30. The access terminal of claim 17, wherein the gating pattern is configured such that power control groups allocated for transmission of forward link power control information are designated for the turning on of the reverse link transmission.

31. The access terminal of claim 17, further comprising means for ignoring reverse link power control information that corresponds to a power control group during which the reverse link transmission is turned off.

32. The access terminal of claim 17, further comprising:
means for re-scheduling a frame early termination acknowledgment (ACK) message allocated to a power control group in a first frame, corresponding to the turning off of the reverse link transmission, to be transmitted during the next power control group in the first frame corresponding to the turning on of the reverse link transmission, wherein the next power control group in the first frame corresponding to the turning on of the reverse link transmission corresponds to a set bit in an ACK mask utilized for frame early termination ACK messages.

33. An access terminal configured for wireless communication, comprising:
at least one processor;
a communication interface coupled to the at least one processor; and
a memory coupled to the at least one processor,
wherein the at least one processor is configured to:
transmit first frames on a reverse link transmission at a first transmit power; and
transmit second frames on the reverse link transmission at a second transmit power,
wherein the at least one processor, being configured to transmit the second frames, is further configured to gate one or more of traffic or pilot frames by turning on and off the reverse link transmission utilizing a gating pattern that is orthogonal to a gating pattern utilized for smart blanking, and
wherein the second transmit power is boosted relative to the first transmit power.

34. The access terminal of claim 33, wherein the gating pattern utilized for smart blanking comprises a gating pattern utilized for 1x smart blanking of ⅛ rate frames.

35. The access terminal of claim 33, wherein the at least one processor, being configured to transmit the second frames, is further configured to gate one or more of the traffic or pilot frames only when the access terminal is in a connected state.

36. The access terminal of claim 33, wherein the second frames comprise one or both of traffic frames or pilot frames.

37. The access terminal of claim 36, wherein the one or both of traffic frames or the pilot frames are carried on a reverse fundamental channel (R-FCH).

38. The access terminal of claim 33, wherein the at least one processor, being configured to transmit the second frames, is further configured to gate one or more of traffic or pilot frames only if a transmit power of the reverse link transmission is less than a threshold.

39. The access terminal of claim 38, wherein the threshold corresponds to a difference between a maximum transmit power and a first value.

40. The access terminal of claim 39, wherein the at least one processor is further configured to alter the first value.

41. The access terminal of claim 39, wherein the transmit power comprises a time-average transmit power.

42. The access terminal of claim 39, wherein the transmit power comprises a filtered average transmit power, such that the at least one processor, being configured to transmit the second frames, is further configured to gate one or more of traffic or pilot frames only if $TxP_{filt}[i] < P_{max} - X$ dB, wherein:
$P_{max}$ is the maximum transmit power;
X is the first value;
i is a frame index; and
$TxP_{filt}[i]$ is the filtered average transmit power corresponding to a frame having the frame index i.

43. The access terminal of claim 42, wherein the filtered average transmit power $TxP_{filt}[i]$ is equal to $\alpha \cdot TxP_{filt}[i-1] + (1-\alpha) \cdot TxP_{avg}[i]$, wherein:
α is a filter coefficient; and
$TxP_{avg}[i]$ is a time-average of a transmit power over a plurality of frames.

44. The access terminal of claim 33, wherein the gating utilizes hysteresis, such that the at least one processor, being configured to gate one or more of traffic or pilot frames, is further configured to:
turn off the gating when $TxP_{filt}[i] \geq P_{max} - X$; and
turn on the gating when $TxP_{filt}[i] \leq P_{max} - X - Y$,
wherein:
i is a frame index;
$TxP_{filt}[i]$ is a filtered average transmit power corresponding to a frame having the frame index i;
$P_{max}$ is a maximum transmit power;
X is the first value; and
Y is a hysteresis constant.

45. The access terminal of claim 33, wherein the at least one processor is further configured to:
configure a mask comprising set bits corresponding to power control groups for receiving reverse link power control information,
wherein the at least one processor, being configured to transmit the second frames, is further configured to gate one or more of traffic or pilot frames utilizing a pattern configured such that the reverse link transmission is turned on during the set bits of the mask.

46. The access terminal of claim 33, wherein the gating pattern is configured such that power control groups allocated for transmission of forward link power control information are designated for the turning on of the reverse link transmission.

47. The access terminal of claim 33, wherein the at least one processor is further configured to ignore reverse link power control information that corresponds to a power control group during which the reverse link transmission is turned off.

48. The access terminal of claim 33, wherein the at least one processor is further configured to re-schedule a frame early termination acknowledgment (ACK) message allocated to a power control group in a first frame, corresponding to the turning off of the reverse link transmission, to be transmitted during the next power control group in the first frame corresponding to the turning on of the reverse link transmission, wherein the next power control group in the first frame corresponding to the turning on of the reverse link transmission corresponds to a set bit in an ACK mask utilized for frame early termination ACK messages.

49. A computer program product, comprising:
a non-transitory computer-readable storage medium operable at an access terminal, comprising instructions for causing a computer to:
transmit first frames on a reverse link transmission at a first transmit power; and
transmit second frames on the reverse link transmission at a second transmit power,
wherein the instructions for causing a computer to transmit the second frames, are further configured to gate one or more of traffic or pilot frames by turning on and off the reverse link transmission utilizing a gating pattern that is orthogonal to a gating pattern utilized for smart blanking, and
wherein the second transmit power is boosted relative to the first transmit power.

50. The computer program product of claim 49, wherein the gating pattern utilized for smart blanking comprises a gating pattern utilized for 1x smart blanking of ⅛ rate frames.

51. The computer program product of claim 49, wherein the instructions for causing a computer to transmit the second frames, are further configured to gate one or more of the traffic or pilot frames only when the access terminal is in a connected state.

52. The computer program product of claim 49, wherein the second frames comprise one or both of traffic frames or pilot frames.

53. The computer program product of claim 52, wherein the one or both of traffic frames or the pilot frames are carried on a reverse fundamental channel (R-FCH).

54. The computer program product of claim 49, wherein the instructions for causing a computer to transmit the second frames, are further configured to gate one or more of traffic or pilot frames only if a transmit power of the reverse link transmission is less than a threshold.

55. The computer program product of claim 54, wherein the threshold corresponds to a difference between a maximum transmit power and a first value.

56. The computer program product of claim 55, wherein the at least one processor is further configured to alter the first value.

57. The computer program product of claim 55, wherein the transmit power comprises a time-average transmit power.

58. The computer program product of claim 55, wherein the transmit power comprises a filtered average transmit power, such that the instructions for causing a computer to transmit the second frames, are further configured to gate one or more of traffic or pilot frames only if $TxP_{filt}[i] < P_{max} - X$ dB, wherein:
$P_{max}$ is the maximum transmit power;
X is the first value;
i is a frame index; and
$TxP_{filt}[i]$ is the filtered average transmit power corresponding to a frame having the frame index i.

59. The computer program product of claim 58, wherein the filtered average transmit power $TxP_{filt}[i]$ is equal to $\alpha \cdot TxP_{filt}[i-1] + (1-\alpha) \cdot TxP_{avg}[i]$, wherein:
$\alpha$ is a filter coefficient; and
$TxP_{avg}[i]$ is a time-average of a transmit power over a plurality of frames.

60. The computer program product of claim 49, wherein the gating utilizes hysteresis, such that the instructions for causing a computer to transmit the second frames, are further configured to:
turn off the gating when $TxP_{filt}[i] \geq P_{max} - X$; and
turn on the gating when $TxP_{filt}[i] \leq P_{max} - X - Y$,
wherein:
i is a frame index;
$TxP_{filt}[i]$ is a filtered average transmit power corresponding to a frame having the frame index i;
$P_{max}$ is a maximum transmit power;
X is the first value; and
Y is a hysteresis constant.

61. The computer program product of claim 49, further comprising instructions for causing a computer to:
configure a mask comprising set bits corresponding to power control groups for receiving reverse link power control information,
wherein the instructions for causing a computer to transmit the second frames, are further configured to gate one or more of traffic or pilot frames utilizing a pattern configured such that the reverse link transmission is turned on during the set bits of the mask.

62. The computer program product of claim 49, wherein the gating pattern is configured such that power control groups allocated for transmission of forward link power control information are designated for the turning on of the reverse link transmission.

63. The computer program product of claim 49, further comprising instructions for causing a computer to ignore reverse link power control information that corresponds to a power control group during which the reverse link transmission is turned off.

64. The computer program product of claim 49, further comprising instructions for causing a computer to re-schedule a frame early termination acknowledgment (ACK) message allocated to a power control group in a first frame, corresponding to the turning off of the reverse link transmission, to be transmitted during the next power control group in the first frame corresponding to the turning on of the reverse link transmission, wherein the next power control group in the first frame corresponding to the turning on of the reverse link transmission corresponds to a set bit in an ACK mask utilized for frame early termination ACK messages.

\* \* \* \* \*